UNITED STATES PATENT OFFICE.

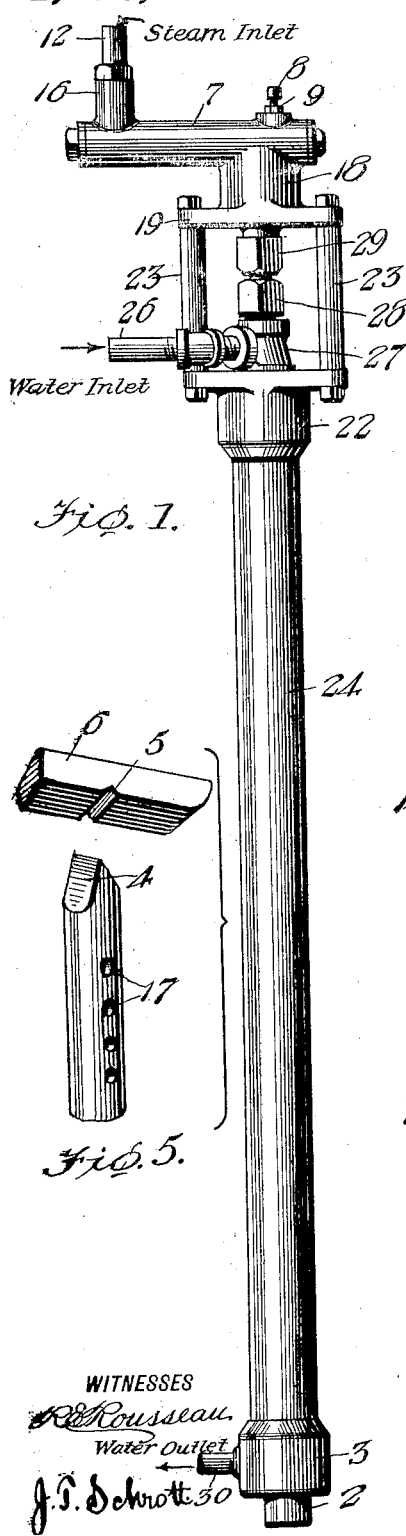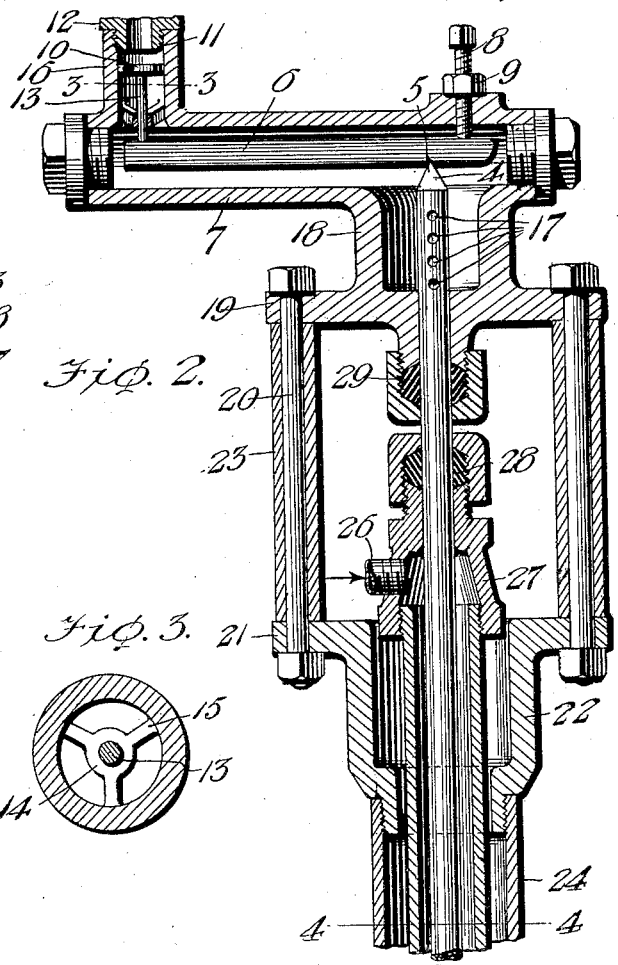

DE FOREST L. RATHBONE, OF JACKSONVILLE, FLORIDA.

WATER-HEATER.

1,346,251.  Specification of Letters Patent.  Patented July 13, 1920.

Application filed January 25, 1919. Serial No. 273,206.

*To all whom it may concern:*

Be it known that I, DE FOREST L. RATHBONE, a citizen of the United States, and a resident of Jacksonville, in the county of Duval and State of Florida, have invented certain new and useful Improvements in Water-Heaters, of which the following is a specification.

My invention relates to improvements in water heaters, being more particularly an improvement in automatic water heaters, and it consists in the constructions, combinations and arrangements herein described and claimed.

The foremost object of my invention is to provide an automatic water heater which employs live steam as the heating means for the water, the steam valve being thermostatically controlled by a novel arrangement of certain of the heater parts, with the ultimate result that the temperature of the usable water is kept at a substantially uniform degree.

A further object of the invention is to provide an automatic water heater embodying the features set forth above whereby very important advantage is derived namely, that the usable water is always ready at the required temperature and the usual custom of letting the water run for a certain period, until it becomes hot enough, is entirely avoided.

Other objects and advantages will appear in the following specification, reference being had to the accompanying drawing, in which:

Figure 1 is a side elevation of the improved automatic water heater,

Fig. 2 is a longitudinal section thereof,

Fig. 3 is a cross section on the line 3—3 of Fig. 2,

Fig. 4 is a cross section on the line 4—4 of Fig. 2, and

Fig. 5 is a detail perspective view illustrating the knife edge pivot between the valve lever or bar and the steam tube.

By way of preface it may be briefly stated that the herein described water heater seeks to overcome the objections and dangers of certain water heaters now in use. Without describing such water heaters in detail they may be simply referred to as consisting of such arrangements whereby the steam and water are independently and manually controlled. Occasions have arisen where a person using the heater had forgotten to turn off the steam, with the result that a charge of extremely hot water collected. The cold water being subsequently turned on, discharged this hot water with the result that the bather became severely scalded.

My invention is so arranged that the temperature of the usable water is always kept at a uniform degree with no possibility of the above contingency happening, this being done by controlling the steam inlet automatically. Attention is now directed to the drawing wherein in Fig. 2 it will be observed first of all that the central expansible and contractible steam tube 1 is securely anchored in the boss 2 of the cast head 3 at the bottom.

Any means for anchoring the steam tube can be employed. The tube 1 is of course hollow but is closed at the upper end to provide a knife edge or fulcrum 4 which occupies the transverse V-shaped slot 5 in the lever or steam valve controlling bar 6. The bar 6 occupies the housing 7, in which the bar is accessible by removal of suitable closure means at the open ends. Various adjustments of the bar 6 can be made by means of the set screw 8 which is locked in its adjustments by the nut 9. The other end of the bar actuates the steam inlet valve 10.

When the free end of the bar rises in the event of the longitudinal expansion of the steam tube 1, the valve 10 is conveyed nearer to the seat 11 in the steam inlet pipe 12, and so the volume of steam coming in is reduced. The stem 13 of the steam valve slides in a guide 14 of the spider 15. The valve itself is so constructed that the steam can pass it in the valve tube 16 in which it slides.

Referring again to the steam tube 1 and its associated parts, the upper end of the tube is pierced by a series of holes 17 by means of which steam enters the tube from the casing 7. The casing or housing 7 has a neck 18 which terminates in a flange 19 through which the stay bolts 20 pass. By means of these bolts the flange 21 of the upper head 22 is secured to the housing, suitable collars 23 being fitted on the bolts to preserve the spacing between the companion flanges.

The heads 3 and 22 are connected by an outer sleeve or pipe 24, which not only defines an air jacket around the heater tube 25 but also joins the upper and lower parts of the heater as just stated. The various pipes 1, 25 and 24 are concentrically disposed as clearly shown in Fig. 4. Water is admitted to the heater tube 25 by the inlet pipe 26 at the top. Although not illustrated, this pipe will in practice be provided with a suitable valve. The pipe 26 screws into the packing coupling 27 which includes the gland 28 through which the tube 1 passes. A similar gland 29 pendent from the flange 19 also admits passage of the tube.

The hot water flows out of the pipe 30 that communicates with the chamber in the head 3 at the bottom. All of the parts of the heater are rigid with the exception of course of the bar 6 and valve 10. The steam tube 1 is firmly anchored at one end and as it expands longitudinally by virtue of the increasing temperature of the steam passing through it, the tube acts on the bar 6 and adjusts the steam valve accordingly.

The operation will be readily understood from the foregoing without repeating it in detail. Briefly stated, however, it is as follows: Normally the steam valve 10 will probably be partly open. Steam thus passes through the tube 1 and out at the bottom. The water present in the heater tube 25 thus keeps at a normal temperature in the neighborhood of 130°.

When the cold water in the pipe 26 is turned on, the steam tube 1 is momentarily chilled and thus contracts slightly. The steam valve 10 is opened farther and more steam is admitted. This again increases the temperature of the steam tube and the whole resultant action is a constant equalizing of temperatures so as to automatically keep the usable water discharged at the pipe 30 at substantially one temperature.

While the construction and arrangement of the automatic water heater is that of a generally preferred form, obviously modifications and changes may be made without departing from the spirit of the invention or the scope of the claims.

I claim:

1. An automatic water heater, comprising a hot water outlet head, heater structure supported on said head and including a housing at the top with a valve tube, a heater tube carried by the supporting head with a cold water inlet at one end, a steam tube anchored in the head and passing through the heater tube to the housing at the top, said steam tube terminating in a closure providing a knife edge and having a series of steam openings; a valve bar fulcrumed on the knife edge, adjusting means bearing on one end of the bar, and a steam valve working in the valve tube and bearing on the other end of the bar, to control a steam inlet by the longitudinal expansive movement of the steam tube.

2. An automatic water heater, comprising a hollow head, incasing means applied to said head, a flanged head supported on said means, a housing with a neck and flange, supported at right angles and in spaced relationship to the aforesaid flanged head, packing means pendent from said neck, a heater tube fitted in communication with the hollow head, a packing coupling with a water inlet carried by the heater tube and provided with companion packing means, a steam tube anchored in the hollow head, and extending through the heater tube and said packing means into said neck and housing, said tube having a knife edge closure and steam openings; a valve bar occupying the housing, removable closure means at the ends of the housing permitting access to said bar, adjusting means bearing on the bar adjacent to its fulcrum on said knife edge, a steam inlet pipe with a valve seat, leading into the housing, and a valve in contact with said bar to control the opening and closing of the steam inlet at the seat.

3. Instrumentalities in an automatic water heater for avoiding lost motion between a heat extensible member and a valve bar actuated thereby; comprising in combination, a steam conducting tube with a knife edge fulcrum, a valve bar with a transverse notch receiving the knife edge, and adjusting means bearing on the bar adjacent to the fulcrum for supporting and retaining the bar on the knife edge, said knife edge and adjusting means being in permanent positive contact with the bar under all circumstances, thus avoiding loss of motion by loosening of pivotal supports.

4. In an automatic water heater, valved steam inlet means with packing means, water conducting means with opposed packing means, anchored steam conducting means passing through the water conducting means and both packing means, with a perforate end in the steam inlet means, and adjustable valve control means operatively mounted on said end.

5. An automatic water heater, comprising a non-extensible heater tube with a cold water inlet and hot water outlet, a perforate ended heat-extensible anchored steam tube, valved means for conducting steam to said perforations, and control means mounted on said tube end, operative to open and close the valve.

DE FOREST L. RATHBONE.